United States Patent
Janakiraman et al.

(10) Patent No.: US 6,956,979 B2
(45) Date of Patent: Oct. 18, 2005

(54) MAGNIFICATION OF INFORMATION WITH USER CONTROLLED LOOK AHEAD AND LOOK BEHIND CONTEXTUAL INFORMATION

(75) Inventors: Janani Janakiraman, Austin, TX (US); Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 09/970,870

(22) Filed: Oct. 4, 2001

(65) Prior Publication Data

US 2003/0068088 A1 Apr. 10, 2003

(51) Int. Cl.⁷ .................................. G06T 3/40
(52) U.S. Cl. ................. 382/301; 345/661; 345/671
(58) Field of Search ........................ 382/114, 298, 382/301; 345/660, 661, 665, 666, 667, 668, 671; 348/63, 561, 581; 358/451

(56) References Cited

U.S. PATENT DOCUMENTS

| | | | | |
|---|---|---|---|---|
| 4,943,870 A | | 7/1990 | Sugishima | 358/451 |
| 5,689,287 A | | 11/1997 | Mackinlay et al. | 345/427 |
| 5,696,530 A | * | 12/1997 | Maejima | 345/127 |
| 5,731,805 A | * | 3/1998 | Tognazzini et al. | 345/156 |
| 5,754,348 A | | 5/1998 | Soohoo | 359/802 |
| 6,211,855 B1 | | 4/2001 | Kim | 345/127 |
| 6,288,702 B1 | * | 9/2001 | Tachibana et al. | 345/130 |
| 6,407,747 B1 | * | 6/2002 | Chui et al. | 345/660 |
| 6,704,034 B1 | * | 3/2004 | Rodriguez et al. | 345/860 |
| 6,768,497 B2 | * | 7/2004 | Baar et al. | 345/661 |
| 2003/0006995 A1 | * | 1/2003 | Smith et al. | 345/671 |

FOREIGN PATENT DOCUMENTS

JP 11184595 7/1999 ............. G06F/3/00

OTHER PUBLICATIONS

IBM Technical Disclosure Bulletin, vol. 37, issue 3, Mar. 1, 1994, pp. 353–354.*
IBM Technical Disclosure Bulletin, vol. 28, issue 8, Jan. 1, 1986, pp. 3720–3722.*
Keahey. The Generalized Detail–in–Context Problem. Proc. IEEE Symp. on Information Visualization, Oct. 19, 1998, pp. 44–51.*

* cited by examiner

*Primary Examiner*—Jon Chang
(74) *Attorney, Agent, or Firm*—Duke W. Yee; Jeffrey S. LaBaw; Stephen R. Tkacs

(57) ABSTRACT

A mechanism is provided for magnifying information with contextual information. The user may configure the magnification mechanism to present some contextual information along with the focus being magnified. Particularly, a user may set "look ahead" and "look behind" parameters to specify a number of words or characters to include before and after the magnified word or words. The actual magnified word or words may be distinguished from the contextual information. For example, the word or words being magnified may be magnified to a size that is larger than that of the contextual information. The magnification mechanism may also present a magnified display of image information.

31 Claims, 4 Drawing Sheets

FIG. 5A
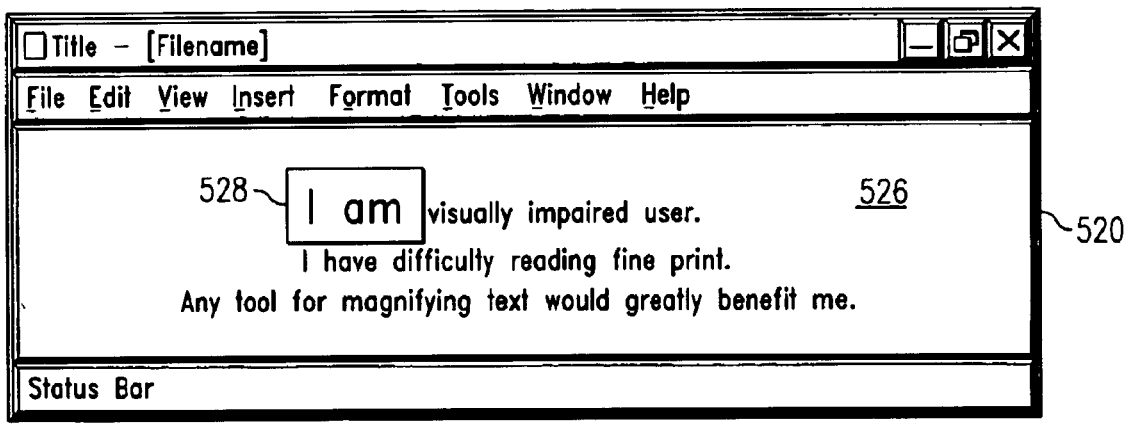
FIG. 5B
FIG. 5C
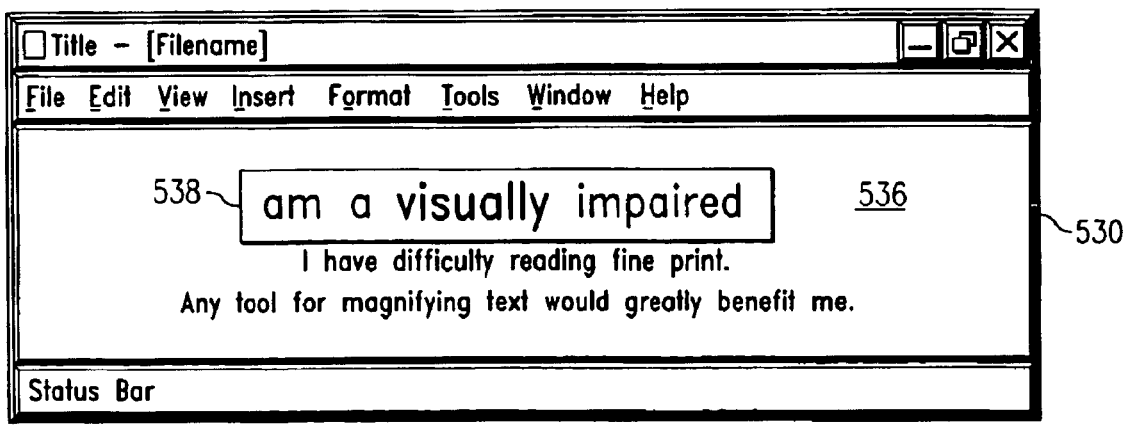

MAGNIFICATION OF INFORMATION WITH USER CONTROLLED LOOK AHEAD AND LOOK BEHIND CONTEXTUAL INFORMATION

BACKGROUND OF THE INVENTION

1. Technical Field

The present invention relates to data processing and, in particular, to document magnification. Still more particularly, the present invention provides a method, apparatus, and program for magnification of information with user controlled look ahead and look behind contextual information.

2. Description of Related Art

Prior art screen magnification software magnifies an area selected by a user. The magnification software may use features like focus tracking, wherein the area of interest on the display screen automatically moves in response to the manipulation of a mouse pointer. Color reversal may also be used to sharpen the clarity of magnified text and images. Magnification software may be associated with an operating system or an application to allow a user to select and magnify areas of interest. The areas of interest may include images; however, more particularly, an area of interest may include text, such as fine print or text that is difficult to read.

Another class of software is screen reading software. Screen readers highlight words as they are presented as audible speech. The highlighting may take the form of contrasting color, for example. Screen reader software is particularly useful for hearing impaired users. Some prior art software programs combine screen readers with magnifiers. Thus the software may magnify text as it is presented as audible speech, allowing users to more easily see text as it is read.

However, prior art magnification software uniformly magnifies the content of interest. Thus, the user may miss contextual information, particularly when the subject matter being magnified is textual. People rarely ready by isolating a single word at a time. Prior art magnification software is not ideally suitable for actually reading and comprehending text. A visually impaired user may use magnification software to see text in a document; however, it may be difficult to read and comprehend magnified text without contextual information. Similarly, an area of interest in an image is more meaningful with surrounding contextual information. Prior art magnification software does not effectively allow a magnified area of interest to be seen in its context.

Therefore, it would be advantageous to provide an improved magnification of information with user controlled look ahead and look behind information.

SUMMARY OF THE INVENTION

The present invention provides a mechanism to magnify information with contextual information. The user may configure the magnification mechanism to present some contextual information along with the subject matter being magnified. Particularly, a user may set "look ahead" and "look behind" parameters to specify a number of words or characters to include before and after a magnified word or words. The actual magnified word or words may be distinguished from the contextual information. For example, the word or words being magnified may be magnified to a size that is larger than that of the contextual information. The magnification mechanism may also present a magnified display of image information.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5A–D are example screens of display of a document viewer window in accordance with a preferred embodiment of the present invention;

DETAILED DESCRIPTION OF THE PREFERRED EMBODIMENT

Figure 1:
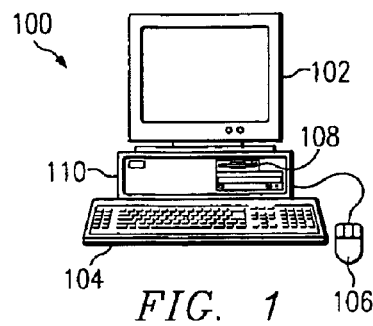
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as a eServer pSeries computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
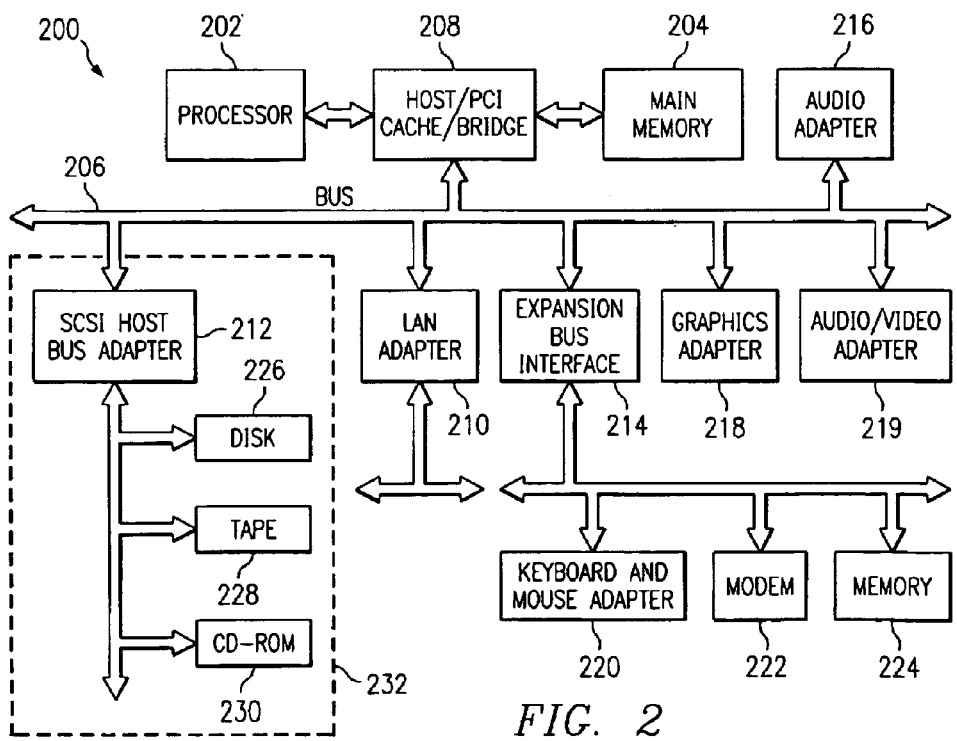
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

Returning to FIG. 1, computer 100 may be configured to execute document viewer software for displaying a document. Computer 100 may also execute a magnification software tool for magnifying information displayed by the document viewer software. The magnification software tool may magnify a word that is proximate to a cursor or may magnify the document word by word to allow the user to read the document. A cursor may be a graphical icon that is displayed on the screen and controlled by a user input device, such as a keyboard or mouse. The magnification focus may also be controlled by software. For example, the document viewer software may be a screen reader that highlights words as they are presented as audible speech. Thus, the magnification tool may magnify each word as it is presented by the screen reader.

In accordance with a preferred embodiment of the present invention, the magnification software tool presents some contextual information along with the word or words being magnified. The actual magnified word or words may be distinguished from the contextual information. For example, the word or words being magnified may be magnified to a size that is larger than that of the contextual information.

Figure 3:
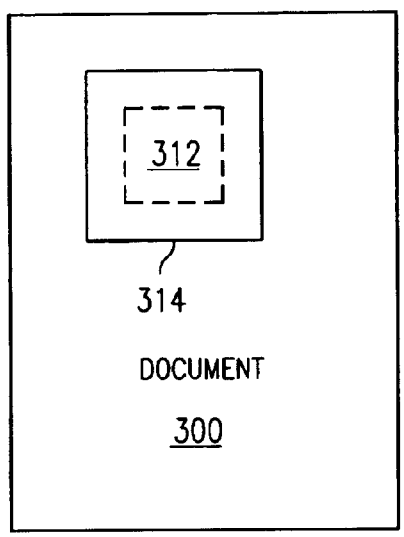
FIG. 3 is a diagram illustrating magnification with contextual information in accordance with a preferred embodiment of the present invention.

With reference to FIG. 3, a diagram illustrating magnification with contextual information is shown in accordance with a preferred embodiment of the present invention. Document 300 includes focus 312 to be magnified. The magnification tool of the present invention identifies context 314 to be presented in the magnification display.

In the example of textual information, document 300 is a text document and focus 312 comprises a selected portion of text, which may include a plurality of words. The selected portion may also include words or characters in a plurality of rows of text. Context 314 may include a predefined number of words or characters before or after the focus. Context 314 may also include lines of text above and below the focus.

Document 300 may also be an image or a combination of text and image. Thus, focus 312 may comprise a selected portion of the document rendered as an image. Context 314 may include a predefined region around the focus. For example, the area of the context may be a user defined percentage, such as 200%, of the focus. The area of the focus and the context may also be set as height and width parameters.

Figure 4:
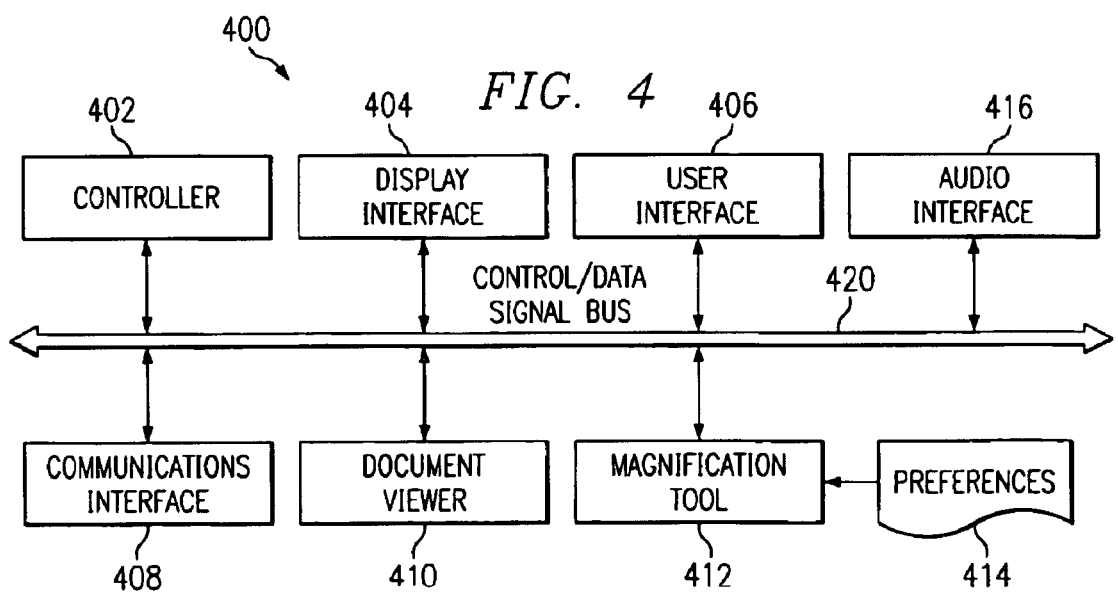
FIG. 4 is an exemplary block diagram of a document viewing system with magnification in accordance with a preferred embodiment of the present invention.

FIG. 4 is an exemplary block diagram of a document viewing system with magnification in accordance with a preferred embodiment of the present invention. Document viewing system 400 includes a controller 402, a display interface 404, a user interface 406, a communications interface 408, a document viewer 410, and a magnification tool 412. The elements 402–412 may be implemented as hardware, software, or a combination of hardware and software. In a preferred embodiment, the elements 402–412 are implemented as software instructions executed by one or more processors.

The elements 402–412 are coupled to one another via the control/data signal bus 420. Although a bus architecture is shown in FIG. 4, the present invention is not limited to such. Rather, any architecture that facilitates the communication of control/data signals between elements 402–412 may be used without departing from the spirit and scope of the present invention. The controller 402 controls the overall operation of the document viewer and orchestrates the operation of the other elements 404–412.

With the operation of the present invention, document viewer 410 instructs controller 402 to display a document via display interface 404. The user interacts with the document viewer via user interface 406. Magnification tool 412 displays a magnified version of a focus selected by the user through user interface 406. Document viewer 410 may also be a screen reader that presents a text document as audible speech via audio interface 416. Document viewer 410 may then communicate with magnification tool 412 to magnify text word by word as it is presented. In other words, the focus may be selected by the document viewer or magnification tool rather than the user. Alternatively, the document viewer and magnification tool may simply present the text word by word as a magnified focus with contextual information without presenting the text as audible speech.

In an alternate embodiment, document viewer 410 may retrieve documents from a remote location. For example, the document viewer may be a Web browser. Thus, document viewing system 400 may receive documents to display from communications interface 408.

In accordance with a preferred embodiment of the present invention, magnification tool 412 presents some contextual information along with the word or words being magnified. The focus may be a word or word and the contextual information may be defined by the user using the user interface. The user may define the amount of contextual information to include in the magnified display using a plurality of parameters. For example, a user may set "look ahead" and "look behind" parameters to specify a number of words or characters to include before and after the magnified word or words. These parameters may be stored in preferences 414 and magnification tool 412 may use the preferences to determine the context for the magnified display.

Furthermore, the document may be an image or a combination of text and image. Magnification tool 412 may then magnify a selected portion of the document as a magnified image. The magnification tool then also presents a surrounding context in the magnified display. The focus may be distinguished from the context by slightly blurring or hazing the context. Alternatively, the focus may be distinguished from the context by magnifying the focus to a greater degree than the context. Thus, the magnified region may have an appearance similar to a physical magnifying glass with the greatest degree of magnification at the center of the glass.

Example screens of display of a document viewer window are shown in FIGS. 5A–D in accordance with a preferred embodiment of the present invention. Particularly, with respect to FIG. 5A, the screen comprises window 500, including a title bar 502, which may display the name of the application program. Title bar 502 also includes a control box 504, which produces a drop-down menu (not shown) when selected with the mouse, and "minimize" 506, "maximize" or "restore" 508, and "close" 510 buttons. The "minimize" and "maximize" or "restore" buttons 506 and 508 determine the manner in which the program window is displayed. In this example, the "close" button 510 produces an "exit" command when selected. The drop-down menu produced by selecting control box 504 includes commands corresponding to "minimize," "maximize" or "restore," and "close" buttons, as well as "move" and "resize" commands.

Document viewer window 500 also includes a menu bar 512. Menus to be selected from menu bar 512 may include "File," "Edit," "View," "Insert," "Format," "Tools," "Window," and "Help." However, menu bar 512 may include fewer or more menus, as understood by a person of ordinary skill in the art. The document viewer window also includes a display area 516 in which the document is presented.

Turning now to FIG. 5B, an example screen of display is shown in which a selected portion of the text is magnified. Document viewer window 520 includes display area 526 in which a document is presented. Magnified display 528 presents a selected portion of text with contextual information. In the example shown in FIG. 5B, the focus text is "I" and the context is the word "am." The focus text is distinguished from the context by increasing the magnification of the focus text relative to the magnification of the context.

Turning to FIG. 5C, document viewer window 530 includes display area 536 for presenting a document. Magnified display 538 presents another selected portion of text with look ahead and look behind information. In the example shown in FIG. 5C, the focus test is the word "visually." The look ahead information is the word "impaired" and the look behind information is "am a." Again, the focus text is distinguished from the context by increasing the magnification of the focus text relative to the magnification of the context; however, other methods may be used to distinguish the focus from the context, such as using bold typeface or a different color.

Figure 5D:
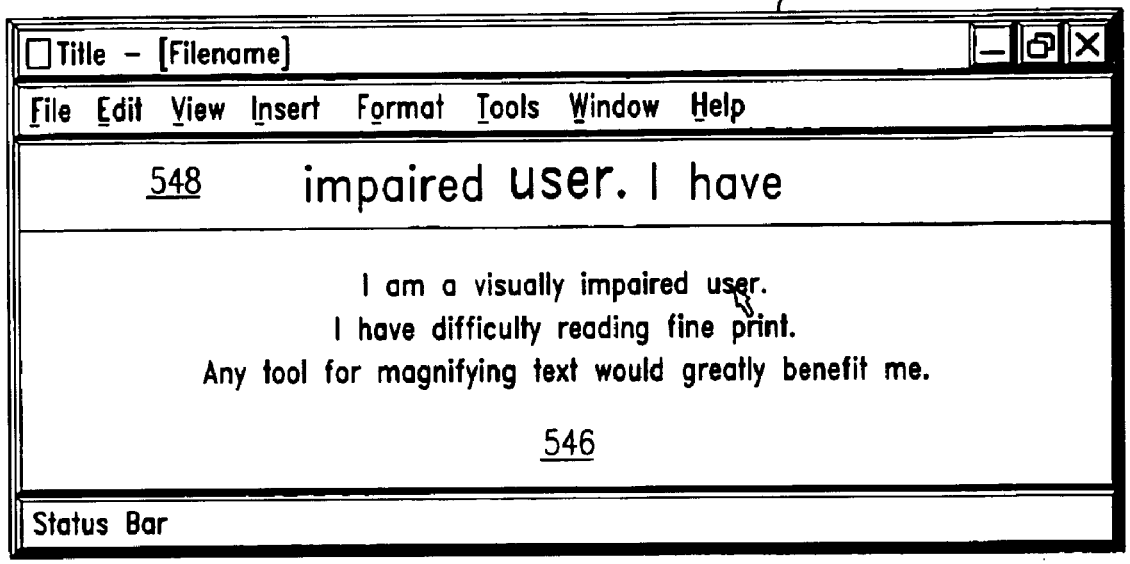

With reference now to FIG. 5D, document viewer 540 includes display area 546 in which a text document is presented. Magnified display area 548 presents a selected portion of text with look ahead and look behind information. In the example shown in FIG. 5D, magnified display area 548 is displayed in a separate portion of the display. Alternatively, the magnified display area may be displayed in a separate window.

Figure 6:
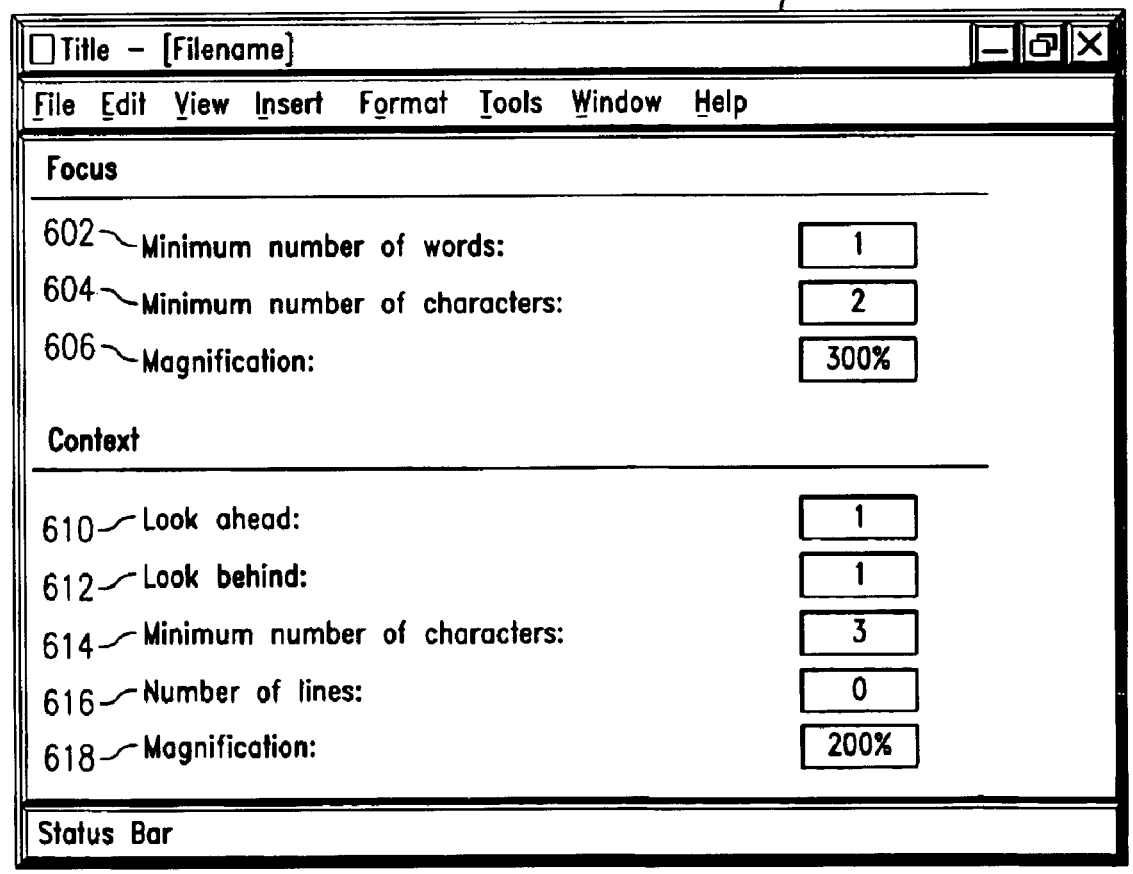
FIG. 6 depicts an example screen of display for a preferences window in accordance with a preferred embodiment of the present invention.

FIG. 6 depicts an example screen of display for a preferences window in accordance with a preferred embodiment of the present invention. Preferences window 600 includes a plurality of fields in which a user may define magnification parameters. In the example shown in FIG. 6, the parameters include a minimum number of words for the focus 602, a minimum number of characters for the focus 604, and a magnification level for the focus 606.

The minimum number of words will typically be one, but may be increased to expand the focus of the magnified display. The minimum number of characters may be set to ensure that the focus of the magnified display includes at least a desired number of characters. Thus, in the example shown in FIG. 5B, if the minimum number of characters is set to "2," then the focus cannot merely include the word "I," but must be expanded to include the word "am." The magnification of the focus may be set by the user to control the size of the focus text in the magnified display.

The parameters also include look ahead 610, look behind 612, a minimum number of characters 614, a number of lines for the context 616, and a magnification level for the context 618. Using the look ahead and look behind parameters, the user controls the minimum number of words for the context in each direction. In the example shown in FIG. 6, the look ahead and look behind are each set to "1"; therefore, the magnified display must include at least one word before and after the focus.

The minimum number of characters for the context may be set to ensure that the context of the magnified display includes at least a desired number of characters. Thus, in the example shown in FIG. 5C, if the minimum number of characters is set to "3," then the look behind context information cannot merely include the word "a," but must be expanded to include the word "am." The number of lines may be set to expand the magnified display to present a desired number of lines above and/or below the focus, thus allowing the user to see the focus in more of a context and improving comprehension.

The magnification of the context may be set by the user to control the size of the context text in the magnified display. Typically, the magnification of the focus will be greater than the magnification of the context. However, other methods for distinguishing the focus from the context may be used, in which case the magnification may be the same for the focus and the context.

The preferences window of FIG. 6 may be modified to accommodate images. For example, the focus may be defined by height, width, and magnification level parameters. The context may be defined by height and width parameters or as a percentage of the focus. Furthermore, the context may also have a separate magnification level to distinguish the focus from the context. In addition, the preferences window of FIG. 6 may also include rules for presenting images and text in proximity to each other. For example, a picture with a caption may be displayed and the user may select the caption to be magnified. The context may include a portion of the image as the context.

FIGS. 5A–5D and 6 show examples in the English language presented in a Western writing system. In other words, text is presented from left to right in lines appearing from top to bottom. However, other languages and writing systems may be accommodated by the present invention. Particularly, a right to left or top to bottom writing system may be used. For example, in a right to left writing system, the look ahead parameters may identify a number of words or characters to the left of the focus and the look behind parameters may identify a number of words or characters to the right of the focus. Similarly, in a top to bottom writing system, the look ahead parameters may identify a number of words or characters beneath the focus and the look behind parameters may identify a number of words or characters above the focus.

Figure 7:
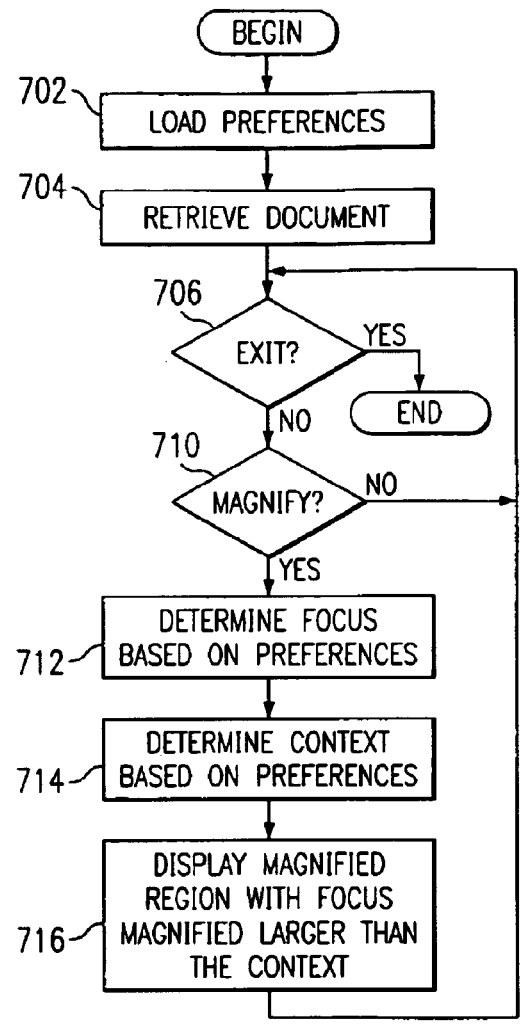
FIG. 7 is a flowchart illustrating the operation of a document viewer with magnification in accordance with a preferred embodiment of the present invention.

With reference to FIG. 7, a flowchart is shown illustrating the operation of a document viewer with magnification in accordance with a preferred embodiment of the present invention. The process begins and loads preferences (step 702) and retrieves a document to display (step 704). Next, a determination is made as to whether an exit condition exists (step 706). If an exit condition exists, the process ends. However, if an exit condition does not exist in step 706, a determination is made as to whether a portion of the document is to be magnified (step 710). If not, the process returns to step 706 to determine whether an exit condition exists.

If a portion of the document is to be magnified in step 710, the process determines the focus (step 712) and determines the context (step 714) based on the user's preferences. Next, the process displays the magnified region with the focus magnified larger than the context (step 716) and returns to step 704 to determine whether an exit condition exists. Step 710 may determine that a portion of the document is to be magnified each time the focus changes. Thus, each time a new portion of text, such as a word, is selected by the user, the document viewer, or the magnification tool, the process determines the focus and the context based on the user's preferences and presents the magnification display.

Thus, the present invention solves the disadvantages of the prior art by providing a mechanism to magnify information with contextual information. The present invention allows the user may configure parameters to define a context to include before and after a magnified focus. The actual magnified focus may be distinguished from the contextual information. Therefore, a user may use the magnification mechanism to read a document with improved comprehension.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for magnifying a portion of a document, comprising:
   determining a focus in a document based on a portion of the document and set of focus preferences;
   determining a context in the document based on a set of context preferences; and
   presenting a magnified display of the focus and the context,
   wherein the step of determining a focus includes identifying at least one focus word, and
   wherein the step of presenting a magnified display includes presenting the focus and the context in different manners.

2. The method of claim 1, wherein the step of determining a focus based on a portion of the document comprises identifying the portion using a pointing device.

3. The method of claim 2, wherein the step of identifying the portion comprises determining a portion of the document that is proximate to a cursor.

4. The method of claim 1, wherein the focus preferences include at least one of a parameter defining a minimum number of words to be magnified, a parameter defining a minimum number of characters to be magnified, and a focus magnification level.

5. The method of claim 1, wherein the step of determining a context comprises:
   identifying at least one look ahead word after the at least one focus word.

6. The method of claim 1, wherein the step of determining a context comprises:
   identifying at least one look behind word before the at least one focus word.

7. The method of claim 1, wherein the context preferences include at least one of a parameter defining a minimum number of words, a parameter defining a minimum number of characters, and a context magnification level.

8. The method of claim 1, wherein the focus preferences include a focus magnification level and the context preferences include a context magnification level.

9. The method of claim 8, wherein the focus magnification level is greater than the context magnification level.

10. The method of claim 1, wherein the focus preferences and the context preferences are modified according to user input.

11. The method of claim 1, wherein the document is rendered as an image and wherein the focus is presented in a focus image portion having a first area.

12. The method of claim 11, wherein the context includes a context image portion having a second area.

13. The method of claim 12, wherein the second area surrounds the first area.

14. The method of claim 1, wherein the step of presenting a magnified display comprises presenting the magnified display substantially integrated as part of the document.

15. The method of claim 1, wherein the step of presenting a magnified display comprises presenting the magnified display in a separate window in proximity to the document.

16. The method of claim 1, wherein the magnified display of the focus and the magnified display of the context are variable in size.

17. The method of claim 1, wherein the step of presenting a magnified display comprises presenting the magnified display based on a mixed rule for image and text in proximity to each other.

18. An apparatus for magnifying a portion of a document, comprising:

first determination means for determining a focus in a document based on a portion of the document and set of focus preferences;

second determination means for determining a context in the document based on a set of context preferences; and presentation means for presenting a magnified display of the focus and the context, wherein the first determination means includes means for identifying at least one focus word, and wherein the presentation means includes means for presenting the focus and the context in different manners.

19. The apparatus of claim 18, wherein the focus preferences include at least one of a parameter defining a minimum number of words to be magnified, a parameter defining a minimum number of characters to be magnified, and a focus magnification level.

20. The apparatus of claim 18, wherein the second determination means comprises:

second identification means for identifying at least one look ahead word after the at least one focus word.

21. The apparatus of claim 18, wherein the second determination means comprises:

third identification means for identifying at least one look behind word before the at least one focus word.

22. The apparatus of claim 18, wherein the context preferences include at least one of a parameter defining a minimum number of words, a parameter defining a minimum number of characters, and a context magnification level.

23. The apparatus of claim 18, wherein the focus preferences include a focus magnification level and the context preferences include a context magnification level.

24. The apparatus of claim 23, wherein the focus magnification level is greater than the context magnification level.

25. The apparatus of claim 18, wherein the focus preferences and the context preferences are modified according to user input.

26. The apparatus of claim 18, wherein the document is rendered as an image and wherein the focus is presented in a focus image portion having a first area.

27. The apparatus of claim 26, wherein the context includes a context image portion having a second area.

28. The apparatus of claim 27, wherein the second area surrounds the first area.

29. The apparatus of claim 18, wherein the presentation means presents the magnified display substantially integrated as part of the document.

30. The apparatus of claim 18, wherein the presentation means presents the magnified display in a separate window in proximity to the document.

31. A computer program product, in a computer readable medium, for magnifying a portion of a document, comprising:

instructions for determining a focus in a document based on a portion of the document and set of focus preferences;

instructions for determining a context in the document based on a set of context preferences; and instructions for presenting a magnified display of the focus and the context, wherein the instructions for determining a focus include instructions for identifying at least one focus word, and wherein the instructions for presenting a magnified display include instructions for presenting the focus and the context in different manners.

* * * * *